Jan. 3, 1950  H. S. JONES  2,493,351

PRESSURE TYPE FIRE DETECTING SYSTEM

Filed April 13, 1946

INVENTOR
Harry S. Jones
BY Henry Lanahan
ATTORNEY

Patented Jan. 3, 1950

2,493,351

UNITED STATES PATENT OFFICE 2,493,351

PRESSURE TYPE FIRE DETECTING SYSTEM

Harry S. Jones, East Orange, N. J., assignor to Thomas A. Edison, Incorporated, West Orange, N. J., a corporation of New Jersey Application April 13, 1946, Serial No. 662,026

3 Claims. (Cl. 177—355)

This invention relates to sealed fluid-filled thermostats and more particularly to a novel form of such thermostat of the differential type.

It is an object of my invention to provide a novel differential thermostat which is responsive to the absolute difference between two temperatures.

It is another object to provide an improved such thermostat which is particularly suitable for fire-detecting purposes.

It is another object to provide a fire-detecting thermostat which is particularly adapted to operate reliably in applications subject to wide changes in ambient temperature.

It is another object to provide novel means and systems for testing such thermostats for operability.

Other objects are to provide a thermostat of the character mentioned which is rugged, efficient, simple in construction, and easy to install and to adjust.

These and other objects and features of my invention will be apparent from the following description and the appended claims.

In the description of my invention reference is had to the accompanying drawings, in which.

In detecting fires in the cargo compartments of aircraft it is desired that an alarm be given positively whenever the temperature at any point within the compartment becomes dangerously high or when the overall temperature of the compartment exceeds the temperature in the cabin by a prescribed amount, say 50° F., this amount being just suitably greater than the widest temperature differential occurring between the cabin and cargo compartments in the normal operation of the airplane. For this fire-detecting application there is desired a thermostat which is capable of detecting continuously (in terms of space) through a long distance, which is capable of operating dependably under conditions of heavy vibration, and which is responsive according to the absolute differential between two temperatures. The present thermostat is adapted particularly to meet these desired objectives.

Figure 1:
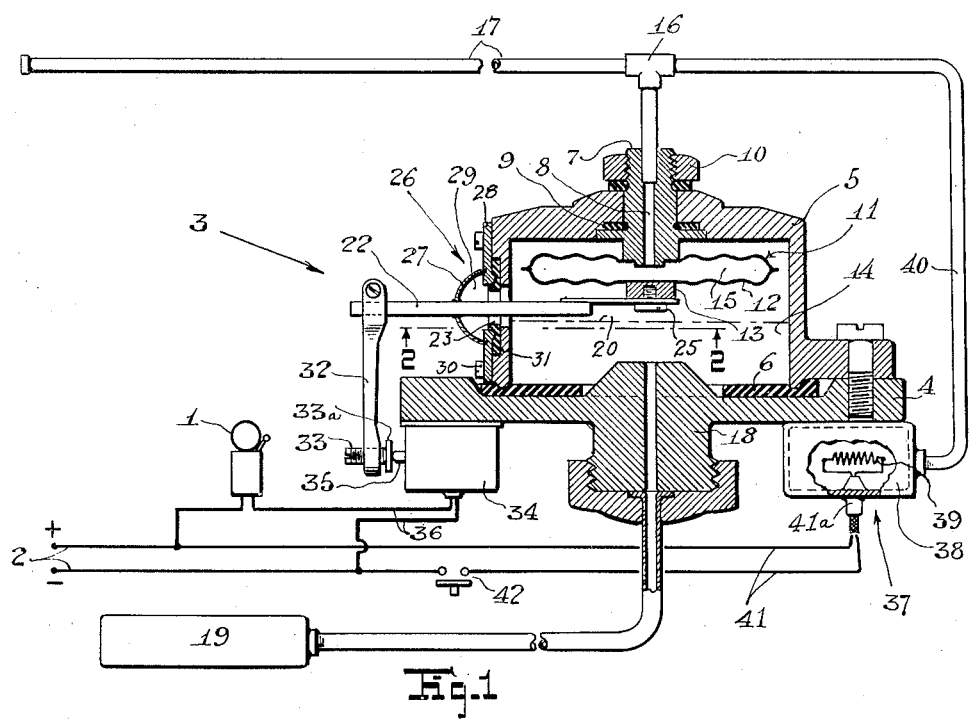
Figure 1 is a view of an alarm system showing therein a sectional view of a differential thermostat according to my invention.

Reference being had to Figure 1, there will be seen an alarm system comprising an alarm device 1, which may be a signal lamp or bell, a power-supply circuit 2 for energizing the alarm 1 and a thermostat 3 according to my invention for controlling the alarm. The thermostat 3 incorporates preferably the basic construction of the pressure gauges disclosed in the pending Furn application Serial No. 572,540, now Patent No. 2,459,931, issued January 25, 1949, having a common assignee with the present application, and in my pending joint application with W. B. M. Clark, Serial No. 574,004, now Patent No. 2,453,324, issued November 9, 1949. This thermostat comprises a supporting base 4 to which there is clamped an inverted cup-shaped housing 5, the housing being sealed airtight to the base by an intervening gasket 6. Mounted on the top wall of the housing is a plug 7 having an axial opening 8 running therethrough into the housing, the plug being sealed to the housing by a gasket 9 and being clamped thereto by a nut 10 threaded on the exterior portion thereof. Sealed to the inner end of the plug is an expansible capsule 11 having a movable wall 12 on the central portion of which there is mounted a button 13. This capsule divides the interior space of the housing into two pressure chambers, a chamber 14 surrounding the capsule and a chamber 15 within the capsule.

The chamber 15 communicates through the opening 8 and thence through a T-fitting 16, which is secured to the plug 7, with a long closed-ended detecting tube 17. This is the detecting tube for the thermostat and is to be placed where a fire may occur. This detecting tube is preferably a long capillary one made of copper, say 50' long by $1/32''$ inside diameter by $1/16''$ outside diameter. The chamber 14 communicates through a nipple 18 on the base 4 with a second closed-ended reference tube preferably having a bulbous form and hereinafter referred to as a bulb 19. This bulb is to be located at a place of reference temperature and may typically comprise a copper tube having a relatively short length and large diameter, say a length of $2\frac{1}{2}'$, an inside diameter of $1/2''$ and an outside diameter of $9/16''$. The volumes of the tube 17 and bulb 19 are preferably substantially equal, but equality is not necessary. However, it is especially important that the volume of the detecting tube 17 be many times greater than that of the capsule 11 in order that the pressure in the chamber 15 will be controlled principally by the tube and be little influenced by the temperature of the thermostat housing. Typically, the housing 5 may be in the same place where the reference bulb 19 is located, in which case the relative volumes of the chamber 14 and bulb 19 are not critical. If, however, the housing is in some other location subject to temperatures different from the temperature of the bulb 19, the volume of the bulb 19 should likewise be many times greater than that of the chamber 14. This may be accomplished by filling substantially the internal space of the chamber 14 with a block 20 as indicated by dash-dot lines in Figure 1.

The chambers 14 and 15 and the respective bulb 19 and tube 17 are filled with any suitable fluid and then sealed airtight from the atmosphere. Preferably clean air or any other suitable gas is employed.

Upon there occurring a pressure variation in one or the other of the chambers 14 and 15 causing a pressure differential to occur across the wall 12, this wall will be deflected so as to tend to equalize the pressure differences between the chambers. By means of a lever 22 the motion of the wall 12 is transmitted through an opening 23 in the housing 5. The inner end of this lever is hinged to the button 13 by a leaf spring 24 one end of which is secured as by welding to the lever and the other end of which is locked to the button by a screw 25. The opening 23 is closed fluid-tight by a motion seal 26 as disclosed in the aforementioned application Serial No. 574,004. This motion seal comprises a thin metal diaphragm 27, preferably of berillium copper, which is cylindrically shaped. The diaphragm is sealed along its base to a frame 28 and at its ends to the edges of arcuate lugs 29 turned up from this frame. The frame is clamped by screws 30 to the housing and is sealed thereto by a gasket 31. The lever 22 extends through the diaphragm and is sealed airtight thereto, the diaphragm serving as a pivot support for the lever.

To the exterior end of the lever 22 there is clamped an arm 32 which depends below the frame 4. Threaded through the lower end portion of this arm is a screw 33 having a flat head 33a which faces towards the frame. Mounted on the frame adjacent to this arm is a switch 34, preferably of the "micro" type. This switch has a button 35 engaged by the screw head 33a. The switch is connected by leads 36 through the alarm device 1, to the power-supply leads 2. Normally the switch is held open by the screw head 33a, as whenever the pressures in the chambers 14 and 15 are equal or nearly so. However, upon any portion of the detecting tube 17 being subjected to a dangerously high temperature or upon the entire detecting tube being subjected to a temperature of the order of 50° F. above that of the bulb 19, the pressure in the chamber 15 is increased sufficiently to release the button 35. When the button is so released the switch 34 is closed and the alarm 1 is put into operation.

In detecting fires in the cargo compartments of airplanes, the thermostat and bulb 19 are placed typically in the cabin and exposed to the temperature therein, and the capillary tube 17 is placed in the cargo compartment and strung one or more times along the length thereof. It may be noted that in applications of this sort where the thermostat is exposed to a reference temperature the necessary enclosed air space outside the capsule 11 may be wholly within the housing 5 and the bulb 19 may be dispensed with. With the use of the present differential thermostat, any normal changes which cause the temperatures in the cabin and cargo compartments to vary nearly alike, regardless of the extent of those changes, will not cause the thermostat to operate. However, should any short length of the detecting tube 17 be subjected to a fire, or should the overall temperature of the cargo compartment rise above the temperature in the cabin by 50° F. or thereabout, the thermostat is operated to put the alarm into operation.

In applications for detecting fires it is important that provision be made to enable the detecting apparatus to be checked conveniently at any moment for operability. This is particularly desirable in airplane applications since the apparatus is here subjected to heavy vibration. To enable the apparatus to be checked readily for operability there is provided a testing unit 37 which is mounted on the underside of the frame 4. This unit comprises an airtight housing 38 having therein an electrical heater 39 diagrammatically shown. The housing is connected by tubing 40 to the T-fitting 16 so that the interior space thereof is in communication with the detecting tube 17 and the chamber 15. Conductors 41 lead out of the housing as through Kovar seals 41a, and connect to the current supply leads 2. In one of the leads 41 however there is serially included a normally-open push-button switch 42.

Upon closing the switch 42 the heater 39 is energized to raise the temperature of the air in the housing 38. Since the housing is in communication with the detecting tube 17, this energizing of the electrical heater is equivalent to applying intense heat to any portion of the detecting tube or heat of lesser magnitude to the detecting tube as a whole. Accordingly, if the apparatus is working properly, the thermostat is operated to put the alarm in operation. Of course, if the alarm is not put in operation as the button is depressed, the operator is informed that the thermostat has become defective.

Figure 3:
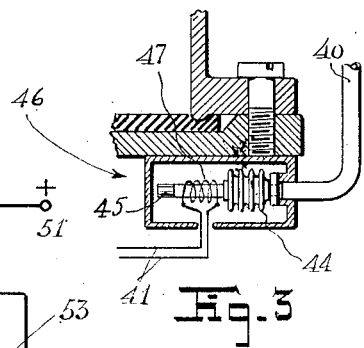
Figure 3 is a detailed fractional view illustrating an alternative form of testing unit for the thermostat of Figure 1.

In Figure 3 there is illustrated an alternative embodiment of testing unit for the thermostat of Figure 1. This unit comprises a housing 43 having therein a sealed bellows 44. The bellows communicates through the tubing 40 to the T-fitting 16 as shown in Figure 1. Secured to the closed end of the bellows is an armature 45 of a solenoid 46 diagrammatically shown. This solenoid has a field coil 47 connected to the lead wires 41 aforementioned.

The bellows is normally in an expanded condition having constant volume and does not influence the operation of the thermostat. However, upon closing the switch 42, the solenoid is immediately energized to compress the bellows. The resultant reduction in volume of the bellows causes the pressure in the chamber 15 to be increased, the same as were the detecting tube 17 heated. Thus, if the thermostat is in working condition, it will be operated to put the alarm into operation when the switch 42 is closed. A feature of this testing unit is that it operates instantly when the switch 42 is closed.

Figure 4:
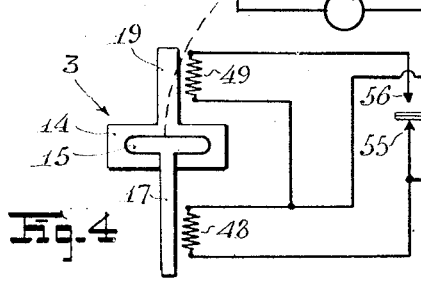
Figure 4 is a diagrammatic view of circuits and mechanism illustrating an alternative arrangement for testing the thermostat of Figure 1 for operability.

In Figure 4 there is illustrated diagrammatically an alternative method of testing the thermostat 3. In this method means are provided for changing the pressure in both pressure chambers 14 and 15. This pressure-changing means comprises a heater 48 associated thermally with the detecting tube 17 and chamber 15 as, for example, in the manner in which the heater 39 is associated with the detecting tube 17 and chamber 15 of Figure 1, and a heater 49 which is associated similarly with the bulb 19 and chamber 14. The heater 48 is connected through a push-button switch 50 to current-supply terminals 51. Also connected from the terminals 51 through the switch 50 is the heater winding 52 of a thermal relay 53 comprising a bimetal element 54 and two contacts 55 and 56. In the unenergized position of the relay the circuit of the heater 48 is completed through the contact 55 and the bimetal element 54 around a resistor 57 connected in shunt with the contact 55 and bimetal element. After a predetermined interval following closing the switch 50, the interval depending upon the timing of the relay 53, the bimetal element 54 breaks with the contact 55 and makes with the contact 56. The effect of this is to insert the resistance 57 in series with the heater 48 and to connect the heater 49 to the current supply terminals.

Figure 2:
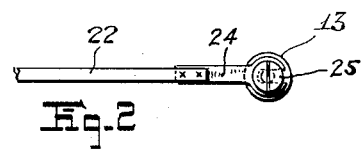
Figure 2 is a fractional sectional view taken on the line 2—2 of Figure 1.

The operation of this testing apparatus is as follows: Upon closing the switch 50 the heater 48 is first energized to produce a predetermined increase in the pressure in the chamber 15. After the thermostat 3 has had time to operate in response to the heating influence of the heater 48, the current energization of the heater 48 is reduced so that this heater is thereafter effective only to maintain the pressure in the chamber 15 at the value which it then has. Concurrently, the heater 49 is energized to produce a predetermined increase in the pressure within the chamber 14. In the event both the chambers 14 and 15 are sealed from the atmosphere and the thermostat is otherwise in working condition, the closing of the switch 50 will cause the thermostat to close the switch 34 and put the alarm in operation and then in a short interval to open the switch 34 and stop the alarm. Of course, the alternative form of pressure-increasing means illustrated in Figure 2 may be employed in this testing system again with the attendant benefit of reducing the time required to make the operability test.

While I have herein shown certain embodiments of my invention, it will be understood that these are illustrative and not necessarily limitative of my invention as the same are subject to changes and modifications without departure from the scope of my invention, which I endeavor to express according to the following claims.

I claim:

1. In a differential thermostat comprising two pressure chambers, a movable wall separating said chambers and temperature-responsive means for varying the pressures in said chambers: a test system comprising means for changing the pressure in one of said chambers, means for changing the pressure in the other of said chambers, and means interconnecting said pressure-changing means and placeable into operation to cause said changing means to be rendered effective in sequence.

2. In a differential thermostat comprising two pressure chambers, a movable wall separating said chambers and temperature-responsive means for varying the pressures in said chambers: a test system comprising a heater associated with one of said chambers, a second heater associated with the second of said chambers, circuit means operable to supply energizing current to one of said heaters, and means operatively associated with said circuit means and responsive at the expiration of a predetermined time interval following the operation of said circuit means for supplying energizing current to the other of said heaters and for concurrently reducing the current to said first heater to maintain substantially the pressure in said one chamber at a stabilized value.

3. In a differential-type apparatus for detecting fire comprising two closed pressure devices one of which is thermally responsive to a place of reference temperature and the other of which is thermally responsive to a place to be checked for fire, and means controlled by said pressure devices to give an alarm when the differential pressure of said devices reaches a predetermined value: a testing system for said apparatus comprising a first means adapted for increasing the pressure of said one device to operate said alarm means; a second means for increasing the pressure of said other device to stop said alarm means; and means operatively interconnecting said first and second means and adapted when connected to a source of energy to cause said first and second means to be operated in sequence whereby to cause said apparatus to give an alarm momentarily provided said apparatus is in operating condition.

HARRY S. JONES.

REFERENCES CITED

The following references are of record in the file of this patent:

UNITED STATES PATENTS

| Number | Name | Date |
|---|---|---|
| 891,743 | Smith | June 23, 1908 |
| 969,414 | Shepherd | Sept. 6, 1910 |
| 997,188 | Fournier | July 4, 1911 |
| 1,143,380 | Gibson | June 15, 1915 |
| 1,653,438 | McLean | Dec. 20, 1927 |
| 1,665,381 | Siddall et al. | Apr. 10, 1928 |
| 1,801,560 | Knaak | Apr. 21, 1931 |
| 1,819,124 | Rockwood | Aug. 18, 1931 |
| 1,885,457 | Lord et al. | Nov. 1, 1932 |
| 1,886,439 | Wells | Nov. 8, 1932 |
| 1,986,479 | Lowe et al. | Jan. 1, 1935 |
| 2,063,703 | Siddall et al. | Dec. 8, 1936 |
| 2,187,124 | Harmon | Jan. 16, 1940 |
| 2,275,949 | Evans | Mar. 10, 1942 |
| 2,376,892 | Avigdor | May 29, 1945 |